(12) United States Patent
Nam et al.

(10) Patent No.: US 11,961,451 B2
(45) Date of Patent: Apr. 16, 2024

(54) DATA TRANSMISSION METHOD, TIMING CONTROLLER, AND STORAGE MEDIUM

(71) Applicants: Beijing ESWIN Computing Technology Co., Ltd., Beijing (CN); Hefei ESWIN Computing Technology Co., Ltd., Hefei (CN)

(72) Inventors: Jangjin Nam, Beijing (CN); Dongmyung Lee, Beijing (CN); Donghoon Baek, Beijing (CN); Daejoon Lee, Beijing (CN)

(73) Assignees: Beijing ESWIN Computing Technology Co., Ltd., Beijing (CN); Hefel ESWIN Computing Technology Co., Ltd., Hefei (CN)

( * ) Notice: Subject to any disclaimer, the term of this patent is extended or adjusted under 35 U.S.C. 154(b) by 0 days.

(21) Appl. No.: 18/147,997

(22) Filed: Dec. 29, 2022

(65) Prior Publication Data

US 2023/0386389 A1 Nov. 30, 2023

(30) Foreign Application Priority Data

May 30, 2022 (CN) .......................... 202210614711.2

(51) Int. Cl.
*G09G 3/20* (2006.01)
*G06F 1/04* (2006.01)
(Continued)

(52) U.S. Cl.
CPC ............ *G09G 3/2096* (2013.01); *G06F 1/04* (2013.01); *G06F 1/08* (2013.01); *G06F 1/12* (2013.01);
(Continued)

(58) Field of Classification Search
CPC ......... G09G 3/2096; G09G 2310/0275; G09G 2320/0693; G09G 2330/021;
(Continued)

(56) References Cited

U.S. PATENT DOCUMENTS

| 2015/0187315 A1 | 7/2015 | Park |
| 2016/0125840 A1* | 5/2016 | Oh .......................... G09G 5/006 345/76 |

(Continued)

FOREIGN PATENT DOCUMENTS

| CN | 108694917 A | 10/2018 |
| CN | 109036300 A | 12/2018 |
| CN | 111477158 A | 7/2020 |

OTHER PUBLICATIONS

China National Intellectual Property Administration, First Office Action in Patent Application No. CN202210614711.2 dated Sep. 8, 2023, which is a foreign counterpart application corresponding to this U.S. Patent Application, to which this application claims priority.

(Continued)

*Primary Examiner* — Douglas M Wilson
(74) *Attorney, Agent, or Firm* — Kolitch Romano Dascenzo Gates LLC

(57) ABSTRACT

Provided is a data transmission method in a timing controller. The data transmission method includes sending clock calibration data to a source driver chip, wherein the clock calibration data instructs the source driver chip to perform a clock calibration; successively sending, in response to completing the clock calibration by the source driver chip, a first identification code and an initialization control instruction to the source driver chip over a data channel, wherein the first identification code indicates a start of transmission of the initialization control instruction, and the initialization control instruction comprises configuration information, the (Continued)

Sending clock calibration data to a source driver chip, wherein the clock calibration data instructs the source driver chip to perform a clock calibration — 201

Successively sending, in response to completing the clock calibration by the source driver chip, a first identification code and an initialization control instruction to the source driver chip over a data channel, wherein the first identification code indicates a start of transmission of the initialization control instruction, and the initialization control instruction includes configuration information, the configuration information instructing the source driver chip to perform a configuration on a physical layer parameter — 202

Successively sending a link stable pattern and display data to the source driver chip — 203 configuration information instructing the source driver chip to perform a configuration on a physical layer parameter; and successively sending a link stable pattern and display data to the source driver chip.

20 Claims, 3 Drawing Sheets

(51) Int. Cl.
    *G06F 1/14*     (2006.01)
    *G06F 1/08*     (2006.01)
    *G06F 1/12*     (2006.01)

(52) U.S. Cl.
    CPC ............. *G06F 1/14* (2013.01); *G09G 3/2092* (2013.01); *G09G 2310/0275* (2013.01); *G09G 2310/08* (2013.01); *G09G 2320/0693* (2013.01); *G09G 2330/021* (2013.01); *G09G 2340/0435* (2013.01); *G09G 2370/08* (2013.01); *G09G 2370/14* (2013.01)

(58) Field of Classification Search
    CPC .. G09G 2370/08; G09G 3/36; G09G 2310/08; G09G 2370/14; G09G 3/2092; G09G 2340/0435; G06F 13/102; G06F 1/08; G06F 1/12; G06F 1/14; G06F 1/04
    See application file for complete search history.

(56) References Cited

U.S. PATENT DOCUMENTS

| | | | |
|---|---|---|---|
| 2016/0284313 A1* | 9/2016 | Lin | G09G 5/18 |
| 2017/0069257 A1* | 3/2017 | Lee | G09G 5/005 |
| 2018/0357946 A1 | 12/2018 | Ryu et al. | |
| 2020/0090616 A1* | 3/2020 | Duan | G09G 3/3685 |
| 2020/0090618 A1* | 3/2020 | Guo | G09G 3/36 |
| 2020/0118518 A1* | 4/2020 | Chu | G09G 5/008 |
| 2020/0126507 A1* | 4/2020 | Guo | G09G 3/20 |
| 2020/0135081 A1* | 4/2020 | Duan | G09G 3/2096 |
| 2020/0143721 A1* | 5/2020 | Chu | H04L 1/242 |
| 2020/0310827 A1* | 10/2020 | Duan | G06F 9/4411 |
| 2021/0193005 A1 | 6/2021 | Kim et al. | |
| 2021/0335291 A1* | 10/2021 | Duan | G09G 3/36 |
| 2022/0114944 A1* | 4/2022 | Duan | G06F 1/14 |
| 2022/0189389 A1* | 6/2022 | Lee | G09G 3/3208 |
| 2023/0179394 A1* | 6/2023 | Kim | G09G 5/008 |
| | | | 375/354 |
| 2023/0215332 A1* | 7/2023 | Cheng | G09G 3/2092 |
| | | | 345/55 |

OTHER PUBLICATIONS

China National Intellectual Property Administration, Second Office Action in Chinese Patent Application No. 202210614711.2 issued on Dec. 7, 2023, which is a foreign counterpart application corresponding to this U.S. Patent Application, to which this application claims priority.

* cited by examiner

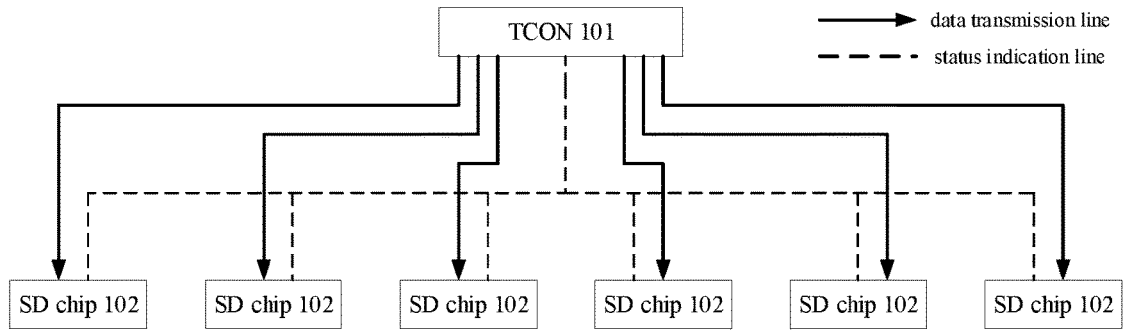
FIG. 1
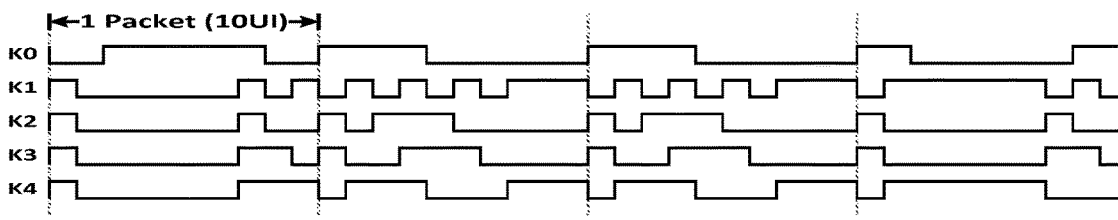
FIG. 2
FIG. 3

DATA TRANSMISSION METHOD, TIMING CONTROLLER, AND STORAGE MEDIUM

CROSS-REFERENCE TO RELATED APPLICATION

This application is based on and claims priority to Chinese Patent Application No. 202210614711.2, filed on May 30, 2022, and entitled "METHOD AND APPARATUS FOR TRANSMITTING DATA, TIMING CONTROLLER, AND STORAGE MEDIUM", the disclosure of which is herein incorporated by reference in its entirety.

TECHNICAL FIELD

The present disclosure relates to the technical field of displays, and in particular, relates to a data transmission method, a timing controller, and a storage medium.

BACKGROUND

Generally, a display apparatus includes a display panel and a drive circuit for driving the display panel. The drive circuit includes a timing controller (TCON) and a source driver (SD) chip. Data is transmitted between the TCON and the SD chip according to a point-to-point (P2P) protocol.

SUMMARY

Embodiments of the present disclosure provide a method and apparatus for transmitting data, a timing controller, and a storage medium. The technical solutions are as follows.

According to some embodiments of the present application, a data transmission method is provided. The method is applied in a TCON, and the method includes:
  sending clock calibration data to an SD chip, wherein the clock calibration data instructs the SD chip to perform a clock calibration;
  successively sending, in response to completing the clock calibration by the SD chip, a first identification code and an initialization control instruction to the SD chip over a data channel, wherein the first identification code indicates a start of transmission of the initialization control instruction, and the initialization control instruction includes configuration information, the configuration information instructing the SD chip to perform a configuration on a physical layer parameter; and
  successively sending an LSP and display data to the SD chip.

In some embodiments, the configuration information includes at least one of drive current configuration information, equalizer (EQ) gain configuration information, and clock data recovery (CDR) loop bandwidth configuration information of the SD chip.

In some embodiments, the configuration information includes, a plurality of bits of data, each of the bits of data corresponding to a transmission period, and each hit of data being repeatedly transmitted multiple times during the transmission period corresponding the bit of data.

In some embodiments, the transmission period corresponding to each bit of data includes a plurality of successive unit intervals (UI), wherein one bit of data is transmitted once within one of the UIs.

In some embodiments, the plurality of bits of data includes a first bit of data and a second bit of data that are adjacent, wherein a third transmission period is present between a first transmission period corresponding to the first hit of data and a second transmission period corresponding to the second bit of data, and the first transmission period is prior to the second transmission period, data transmitted in the third transmission period being data acquired by inverting the first bit of data.

In some embodiments, a number of clock edges in a signal for carrying the first identification code is less than a number of clock edges in a signal for carrying a second identification code, the second identification code being an identification code transmitted upon transmitting the initialization control instruction.

In some embodiments, the first identification code includes a first sub-code and a second sub-code that are adjacent, a clock edge being present between a signal for carrying the first sub-code and a signal for carrying the second sub-code.

According to some embodiments of the present application, a TCON is provided, the TCON includes:
  a processor, a transceiver, and a memory storing one or more instructions executable by the processor;
  wherein the processor, when loading and running the one or more instructions, is caused to control the transceiver to perform the data transmission method as described above.

According to some embodiments of the present application, a non-transitory computer-readable storage medium is provided. The storage medium stores one or more computer programs. The one or more computer programs, when loaded and executed by a computer, cause the computer to perform the data transmission method as described above.

According to some embodiments of the present application, a computer program product including one or more instructions is provided. The one or more instructions, when loaded and run by a computer, cause the computer to perform the data transmission method as described above.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

FIG. 1 is a system architecture diagram involved in a data transmission method according to some embodiments of the present disclosure;

FIG. 2 is a flowchart of a data transmission method according to some embodiments of the present disclosure;

FIG. 3 is a schematic diagram of signals for carrying a first identification code and a second identification code according to some embodiments of the present disclosure;

DETAILED DESCRIPTION

Figure 4:
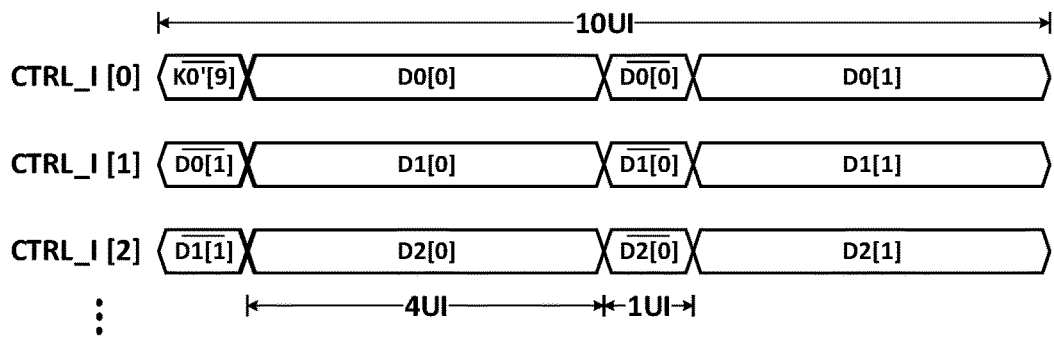
FIG. 4 is a schematic diagram of the transmission of an initialization control instruction according to some embodiments of the present disclosure.

The present disclosure is described in further detail with reference to the enclosed drawings, to clearly present the objects, technical solutions, and advantages of the present disclosure.

Prior to the detailed description of the embodiments of the present disclosure, implementation environments involved in the embodiments of the present disclosure are described hereinafter first.

A display apparatus generally includes a display panel and a drive circuit for driving the display panel. The display apparatus may be a liquid crystal display apparatus or other types of display apparatus. A data transmission method according to some embodiments of the present disclosure is mainly applied in the drive circuit of the display apparatus.

Referring to FIG. 1, the drive circuit includes a timing controller TCON 101 and a plurality of source driver SD chips 102. Each of the SD chips 102 is configured to drive a display region of the display panel to display images. The plurality of SD chips 102 are capable of driving a whole display region of the display panel to display the images. The TCON 101 establishes a communication connection and interacts data with each of the SD chips 102 over a P2P protocol. For example, the P2P protocol is a clock-embedded high-speed point-to-point interface (CHPI) protocol.

It should be noted that, referring to FIG. 1, the TCON 101 is connected to each of the SD chips 102 over a data transmission line, and the data transmission line is a data channel for transmitting the data between the TCON 101 and the SD chip 102. In addition, the TCON 101 is connected to each of SD chips over a status indication line. A signal transmitted in the data transmission line is a unidirectional transmission signal, and the unidirectional transmission signal is transmitted from the TCON 101 to the SD chip 102. The status indication line indicates whether the SD chip 102 needs to perform clock calibration, that is, indicating whether the SD chip 102 is lock loss.

In the related art, a timing controller sends clock calibration data to the a source driver chip over the data transmission line in the case that the source driver chip is determined to be required to perform the clock calibration based on the status indication line. In the case that each of the source driver chips completes the clock calibration based on the clock calibration data sent by the timing controller, the timing controller sends a link stable pattern (LSP) and display data to the source driver chip successively.

As can be seen from this process, in the related art, the timing controller cannot perform a configuration on a physical layer parameter of the source driver chip prior to sending the LSP and the display data to the source driver chip. As a result, receiving performance of the source driver chip cannot be optimized, the LSP is unstable, and the display data received by the source driver chip is unstable. For example, the error rate of the received data is high or even the data is lost, thereby adversely affecting the image display quality.

The embodiments of the present disclosure provide a data transmission method, applicable to implementing a configuration of the physical layer parameter of the SD chip 102 by the TCON 101. That is, after the SD chip 102 completes the clock calibration, the TCON 101 sends a first identification code and an initialization control instruction to the SD chip 102 over the data transmission line, and the physical layer parameter of the SD chip 102 is configured by configuration information in the initialization control instruction. In this way, the SD chip 102 is capable of accurately analyzing the initialization control instruction based on the first identification code to acquire the configuration information, and then configures itself based on the configuration information to optimize the receiving performance, such that receiving qualities of the subsequent LSP and display data are improved, thereby improving the image display quality.

The data transmission method according to some embodiments of the present disclosure is described hereinafter.

FIG. 2 is a flowchart of a data transmission method according to some embodiments of the present disclosure. The method is applied in the TCON of the aforementioned display apparatus. Referring to FIG. 2, the method includes the following steps.

In step 201, clock calibration data is sent to a source driver (SD) chip.

In some embodiments of the present disclosure, a status indication line is connected between the TCON and each of the SD chips. In the case that the TCON and the SD chip are power-on or reset, the TCON determines, by detecting a level state of the status indication line, whether the SD chip needs to perform clock calibration. Upon determining that the SD chip needs to perform the clock calibration, the TCON sends the clock calibration data to each of the SD chips over a data transmission line. Upon receiving the clock calibration data sent by the TCON, each of the SD chips restores a data clock from the clock calibration data to acquire the clock signal synchronized with the TCON.

In some embodiments, the status indication line is a single-ended signal line for indicating whether the SD chip is a lock loss. For example, the status indication line is the single-ended signal line from the SD chip to the TCON. In the case the TCON and the SD chip are power-on or reset, the status indication line is in the first level state by default. Upon detecting that the status indication line is in the first level state, the TCON sends the clock calibration data to each of the SD chips over the data transmission lines. The first level state indicates the lock loss, and the first level state may be a high level or a low level, which is not limited herein.

One of the SD chips is taken as an example. The data transmission line between the TCON and the SD chip includes at least one pair of differential signal lines. Each pair of differential signal lines is a data channel for transmitting a pair of differential signals. The TCON sends the clock calibration data to the SD chip over each of the data channels between the TCON and the SD chip, or sends the clock calibration data to the SD chip over one of the data channels between the TCON and the SD chip, which is not limited herein.

The above clock calibration data is a clock data recovery (CDR) sequence, and the SD chip includes a CDR circuit. Upon receiving the CDR sequence, the CDR circuit in the SD chip restores the clock signal synchronized with the TCON from the CDR sequence.

In step 202, a first identification code and an initialization control instruction are successively sent to the source driver chip over the data channel in response to completing the clock calibration by the source driver chip. The first identification code indicates the start of transmission of the initialization control instruction. The initialization control instruction includes configuration information, and the configuration information instructs the source driver chip to perform a configuration on a physical layer parameter.

After completing the clock calibration, that is, upon the successful clock calibration, each of the SD chips controls the status indication line connected to itself to switch from the first level state to a second level state. In a case where the TCON detects that the status indication line is in the second level state, it is determined that each of the SD chips has completed the clock calibration. In this case, the TCON successively sends the first identification code and the initialization control instruction over the data transmission line between the TCON and the SD chip.

The second level state is different from the first level state. For example, in the case that the first level state is a high level, then the second level state is a low level; and in the case that the first level state is a low level, then the second level state is a high level Still taking one of the SD chips as an example. The TCON sends the first identification code to the SD chip over each pair of differential signal lines between the TCON and the SD chip. That is, the TCON sends the first identification code to the SD chip over each of the data channels between the TCON and the SD chip.

The first identification code includes a plurality of sub-codes. In some embodiments, the first identification code includes four sub-codes, and each of the sub-codes includes ten bits of data.

In some embodiments, in each adjacent sub-codes of the plurality of sub-codes, the bit of data at the lowest order in the preceding sub-code is different from the bit of data at the highest order in the following sub-code.

For example, any adjacent sub-codes are taken as an example, and the adjacent sub-codes are referred to as a first sub-code and a second sub-code. In the case that the first sub-code is prior to the second sub-code, the bit of data at the lowest order in the first sub-code is different from the bit of data at the highest order in the second sub-code. For example, the bit of data at the lowest order in the first sub-code is 1, and the bit of data at the highest order in the second sub-code is 0; or the bit of data at the lowest order in the first sub-code is 0, and the bit of data at the highest order in the second sub-code is 1. In this way, a clock edge is formed between a signal carrying the first sub-code and a signal carrying the second sub-code. The clock edge is a jump edge formed by changing from 0 to 1 or from 1 to 0. In this way, it is convenient for the SD chip to recognize each of the sub-codes in the first identification code, and thus decode the sub-codes accurately.

In some embodiments, the number of clock edges in a signal for carrying the first identification code is less than the number of clock edges in a signal for carrying a second identification code. The second identification code is an identification code transmitted upon transmitting the initialization control instruction.

In some embodiments, the second identification code is any one of a K1 code, a K2 code, a K3 code, and a K4 code.

The K1 code is configured to identify the start of transmission of a row of pixel data during the process of subsequently transmitting the display data. The K2 code is configured to identify the end of the transmission of the row of pixel data, or the start of transmission of the LSP. The K3 code is configured to identify the reset of a scrambling function. The K4 code is configured to identify the end of transmission of the last row of pixel data in a frame of data.

In some embodiments, each of the above K codes includes four sub-codes. In adjacent sub-codes of the four sub-codes, the bit of data at the highest order in the preceding sub-code is different from the bit of data at the lowest order in the following sub-code. The four sub-codes are divided into two groups, a sub-code in each of the groups is acquired by inverting another sub-code. Each of the sub-codes includes ten bits of data.

For example, as illustrated in table 1, the K1 code typically consists of two sub-codes in K1' and two sub-codes in G1', the K2 code typically consists of two sub-codes in K2' and two sub-codes in G2', the K3 code typically consists of two sub-codes in K3' and two sub-codes in G3', and the K4 code typically consists of two sub-codes in K4' and two sub-codes in G4'. Accordingly, signals for carrying the K1 code, the K2 code, the K3 code, and the K4 code are shown in FIG. 3.

TABLE 1

Second identification codes

| K1' | 0b0111111010 | 0b1000000101 | G1' | 0b0101010111 | 0b1010101000 |
| K2' | 0b0111111011 | 0b1000000100 | G2' | 0b0100011111 | 0b1011100000 |
| K3' | 0b0111111001 | 0b1000000110 | G3' | 0b0110001111 | 0b1001110000 |
| K4' | 0b0111111000 | 0b1000000111 | G4' | 0b0111000111 | 0b1000111000 |

The second identification code is an identification code used during the process of subsequently transmitting the LSP and the display data. That is, the second identification code is typically transmitted in the case that receiving performance of the SD chip is stable. The first identification code is transmitted prior to the configuration information. Upon transmitting the first identification code, the SD chip has not performed the configuration on the physical layer parameter based on the configuration information, and thus the receiving performance cannot be optimized. To ensure that the SD chip is capable of steadily receiving the accurate first identification code, the number of the clock edges in the signal for carrying the first identification code is less than the number of the clock edges in the signal for carrying the second identification code. That is, the number of times of switching different bits of data in the first identification code is less than the number of times of switching different bits of data in the second identification code.

For example, the first identification code consists of two sub-codes in K0' and two sub-codes in G0' in table 2. In the two sub-codes included in K0', a sub-code is acquired by inverting another sub-code. Similarly, in the two sub-codes included in G0', a sub-code is acquired by inverting another sub-code. Accordingly, the signals for carrying the first identification code (K0) are shown in FIG. 3.

TABLE 2

First identification codes

| K0' | 0b0011111100 | 0b1100000011 | G0' | 0b0000111111 | 0b1111000000 |

Upon transmitting the first identification code to the SD chip, the TCON sends the initialization control instruction to the SD chip over each pair of the differential signal lines between the TCON and the SD chip. That is, the TCON sends the initialization control instruction to the SD chip over each of the data channels between the TCON and the SD chip. The configuration information of the initialization control instruction transmitted over each data channel is configured to instruct the SD chip to perform the configuration on the physical layer parameter corresponding to the data channel That is, the configuration information of the initialization control instruction transmitted over one of the data channels is configured to instruct the SD chip to perform the configuration on the physical layer parameter of the one of the data channels.

In some embodiments, the configuration information of the initialization control instructions transmitted over the above data channels is identical. In this case, the configurations of the SD chip for the physical layer parameters of the data channels are identical.

In some embodiments, in the case that the TCON wants to control the configurations of the physical layer parameters of the data channels to be identical, the TCON sends the initialization control instruction over one of the data channels between the TCON and the SD chip, instead of sending the identical initialization control instruction over each of the data channels. Accordingly, the first identification code is sent over the one of the data channels instead of being sent over each of the data channels.

In some embodiments, the configuration information of the initialization control instructions as sent is different over at least two of the data channels. In this case, the configurations of the physical layer parameters of different data channels are different. Because performance of the different data channels may be different, performing the configurations on the physical layer parameters of the different data channels by using the different configuration information is beneficial for the SD chip to optimize the receiving performance for the data transmitted over the corresponding data channel.

The configuration information includes at least one of drive current configuration information of the SD chip, equalizer (EQ) gain configuration information, and clock data recovery (CDR) loop bandwidth configuration information.

The drive current configuration information is configured to set the drive current of the SD chip. The drive current is a drive current of a high-speed receiver in the SD chip. The drive current of the SD chip is positively correlated with a data transmission rate. Therefore, the data transmission rate is better matched by configuring the drive current of the SD chip, thereby ensuring the stability of the data transmission.

In some embodiments, the drive current configuration information is instruction information of a current level. For example, the drive current configuration information is any one of a normal mode, a current gear 1, a current gear 2, and a current gear 3. The normal mode is configured to instruct the SD chip to set the drive current as a default current value. The current gears 1 to 3 are configured to instruct the SD chip to set the drive current to be a current value of the corresponding current gear. The current value of each of the current gears is preset in the SD chip.

The EQ gain configuration information is configured to set an EQ equalization gain of the SD chip. The EQ is a component for calibrating an amplitude frequency characteristic and a phase frequency characteristic of the data channel. That is, the EQ performs amplitude, frequency, and phase compensation of the signal received by the SD chip to reduce the error rate of the received data. By configuring the appropriate EQ equalization gain for the SD chip, the EQ is capable of performing signal compensation better, such that the accuracy of the data transmission is improved. In some embodiments, the gain configuration information of the EQ includes an EQ equalization peak gain and an EQ equalization direct-current gain of the data channel.

The CDR loop bandwidth configuration information is configured to set a CDR loop bandwidth of the SD chip. The CDR loop bandwidth is a loop bandwidth of the CDR circuit in the SD chip. The CDR circuit includes a phase locking loop (PLL), and the PLL is configured to lock a frequency and phase of the clock signal. In this case, the CDR loop bandwidth is a loop bandwidth of the PLL. The loop bandwidth of the PLL is a noise bandwidth of a narrow-band tracking filter equivalent to a PLL loop for characterizing an effect on suppressing the noise by the PLL loop. The ability of the PLL loop to suppress the noise affects the lock of the PLL, that is, affects the clock calibration of the SD chip. In some embodiments, the CDR loop bandwidth configuration information includes a CDR loop bandwidth value.

In some embodiments, the configuration information includes terminal resistor configuration information and transmission rate configuration information. For any pair of differential signal lines connected between the TCON and the SD chip, the SD chip includes a terminal resistor corresponding to the pair of differential signal lines. The terminal resistor is connected between the pair of differential signal lines for impedance matching to improve the quality of the transmitted signal. The terminal resistor configuration information is configured to set the magnitude of the terminal resistor connected between each pair of differential signal lines connected to the SD chip. The transmission rate configuration information is configured to set the data transmission rate of the data channel between the TCON and the SD chip.

In some embodiments, the configuration information carried in the aforementioned initialization control instruction is expressed by a plurality of bits of data.

For example, the drive current configuration information is expressed by successive two bits of data. In the case that the two bits of data are 00, it indicates the normal mode, that is, instructing the SD chip to configure the drive current as the default current value. In the case that the two bits of data are 01, it indicates the current gear 1. In the case that the two bits of data are 10, it indicates the current gear 2. In the case that the two bits of data are 11, it indicates the current gear 3.

The EQ gain configuration information is expressed by successive four bits of data. In the case that the four bits of data are 0000, it instructs to configure the EQ equalization direct-current gain as a minimum gain. In the case that the four bits of data are 1111, it instructs to configure the EQ equalization direct-current gain as a maximum gain. In the case that the four bits of data are other values from 0000 to 1111, it instructs to configure the EQ equalization direct-current gain as a gain corresponding to the corresponding value.

The CDR loop bandwidth configuration information is expressed by successive four bits of data. In the case that the four bits of data are 0000, it instructs to configure the CDR loop bandwidth as a minimum loop bandwidth. In the case that the four bits of data are 1111, it instructs to configure the CDR loop bandwidth as a maximum loop bandwidth. In the case that the four bits of data are other values from 0000 to 1111, it instructs to configure the CDR loop bandwidth as a loop bandwidth corresponding to the corresponding value.

Other types of configuration information are expressed by one or a plurality of successive bits of data, which are not limited herein. In addition, the initialization control instruction includes a plurality of preserved bits for subsequent expansion.

In some embodiments, each bit of data in the aforementioned initialization control instruction corresponds to a transmission period, and each bit of data is repeatedly sent multiple times during the transmission period corresponding to the hit of data. In this way, the probability of missing data by the SD chip in the case that the receiving performance has not optimized is reduced, thereby improving the stability of receiving data.

In some embodiments, the transmission period corresponding to each bit of data includes a plurality of successive unit intervals (UIs), such as four successive UIs. On this basis, when the initialization control instruction is sent to the SD chip, for any of the bits of data, the TCON sends the bit of data once per UI during the transmission period corresponding to the bit of data.

In some embodiments, in the case that the SD chip receives the same bit of data for a long time, that is, in the case that the SD chip does not receive the signal of the clock edge for a long time, then the SD chip is prone to lock loss. On this basis, for any adjacent bits of data in the initialization control instruction, such as a first bit of data and a second bit of data, a third transmission period is present between a first transmission period corresponding to the first bit of data and a second transmission period corresponding to the second bit of data. The first transmission period is prior to the second transmission period. Data acquired by inverting the first bit of data is transmitted during the third transmission period.

In some embodiments, the third transmission period includes one of the UIs. That is, the clock edge is formed by transmitting the data acquired by inverting the first bit of data once. In some embodiments, the third transmission period includes more than one UI, such as two or three, which is not limited herein.

According to the aforementioned method, the inverted data of the previous data is transmitted between adjacent bits of data, such that the number of the clock edges during the transmission of the bits of data of the initialization control instruction is increased, thereby facilitating maintaining the clock signal locked.

FIG. 4 is a schematic diagram of the transmission of an initialization control instruction according to some embodiments of the present disclosure. Referring to FIG. 4, each adjacent bits of data in the initialization control instruction is transmitted as a group. CTRL_I[i] indicates an $(i+1)^{th}$ group of bit of data in the initialization control instruction, and i is greater than or equal to 0. Di[0] indicates a first bit of data in the $(i+1)^{th}$ group, and Di[1] indicates a second bit of data in the $(i+1)^{th}$ group. In this way, in the case that the last bit of data of the first identification code is transmitted, D0[0] is repeatedly transmitted four times by four UIs first, and then data $\overline{D0[0]}$ acquired by inverting the D0[0] is transmitted by one UI. Afterwards, D0[1] is repeatedly transmitted four times by four UIs, wherein the D0[1] is the next bit of data of the D0[0], and the like.

In some embodiments, the initialization control instruction is encoded without a coding mode of 8B/10B and without scrambling.

In the case that the TCON transmits the initialization control instruction to the SD chip, the SD chip receives and analyzes the initialization control instruction to acquire the configuration information, and further performs initialization configuration on its own physical layer parameter based on the configuration information.

The SD chip performs, based on the configuration information carried in the initialization control instruction, a configuration on a register corresponding to the configuration information to implement the configuration of the physical layer parameter.

In some embodiments, the aforementioned first identification code is a portion of the initialization control instruction. That is, the TCON directly sends the initialization control instruction to the SD chip, wherein the initialization control instruction includes the first identification code and the configuration information, and the first identification code is configured to instruct the start of the transmission of the configuration information. In this way, the SD chip accurately receives the subsequent configuration information by identifying the first identification code.

In step 203: the LSP and the display data are successively sent to the SD chip.

Upon sending the initialization control instruction to the SD chip, the TCON sends the LSP to the SD chip over the data transmission line.

In some embodiments, any of the SD chips is taken as an example. The TCON sends the LSP to the SD chip over each pair of differential signal lines between the TCON and the SD chip. That is, the LSP is transmitted over each pair of differential signal lines. Upon receiving the LSP, the SD chip performs phase deviation calibration and scrambling reset based on the LSP to prepare for the subsequent reception of the display data.

Figure 5:
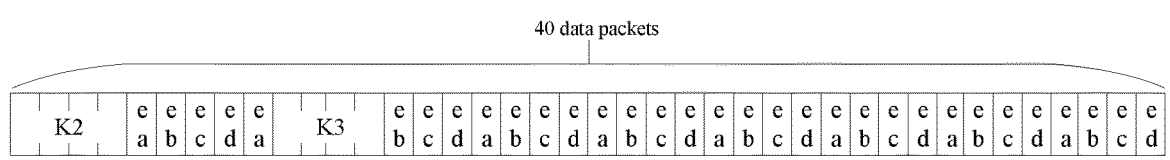
FIG. 5 is a schematic diagram of a data structure of an LSP according to some embodiments of the present disclosure.

The LSP is a specific sequence, and the LSP includes two identification codes and eight data units. Referring to FIG. 5, the two identification codes are respectively a K2 code and a K3 code. Each of the eight data units includes four successive data packets. In some embodiments, the four successive data packets are respectively 0xea, 0xeb, 0xec, and 0xed. The LSP uses the K2 code as a start, then is immediately followed by at least one of the data units, and the K3 code is inserted between any two of the data packets following the at least one of the data units, so as to instruct the reset of a scrambling function. The data packets in the LSP except for the K codes are encoded in an 8B/10B coding mode.

It should be noted that the TCON transmits the LSP to the SD chip at least five times and lasts for more than one microsecond.

Upon sending the LSP to the SD chip, the TCON sends the display data to the SD chip.

As described above, each of the SD chips in the drive circuit is configured to drive the display region of the display panel to display images. On this basis, the TCON acquires a plurality of rows of pixel data of the display region corresponding to the SD chip in a piece of frame data to be displayed currently, and sends the display data to the SD chip based on the plurality of rows of pixel data. The display data includes any row of pixel data in the plurality of rows of pixel data. The frame data to be displayed currently is either video frame data in a video stream or static image frame data.

In some embodiments, the pixel data between the TCON and the SD chip is transmitted frame by frame, and each frame data is transmitted row by row. In some embodiments of the present disclosure, a row of pixel data corresponds to a row control instruction, and the row of pixel data is transmitted immediately following the transmission of the row control instruction. The row control instruction is configured to identify a frame initialization polarity control signal, a flip mode, a low-power mode, and a loading signal time sequence of the SD chip. A K1 code is transmitted prior to transmitting the row control instruction, and the first identification code is configured to identify the start of transmission of a row of pixel data. A K2 code is transmitted upon transmitting the row of pixel data, the second identification code is configured to identify the end of the transmission of the row of pixel data and a start of a horizontal blank period (HBP). The horizontal blank period indicates an interval between the end of transmission of the row of pixel data and the start of transmission of the next row of pixel data. Idle data with a constant length is transmitted upon the K2 code.

In some embodiments of the present disclosure, the row control instruction further includes first power indication information. The first power indication information is used to indicate whether to enter the low-power mode during the horizontal blank period.

In some embodiments, in the case that the first power indication information in the row control instruction is a first value, the first power indication information indicates that the TCON enters the low-power mode in the horizontal blank period, wherein the first value is either 0 or 1. In this way, upon transmitting the idle data after the K2, the TCON controls a pair of differential signal lines transmitting the row of pixel data to be at a low level, and thus the TCON enters the low-power mode.

Upon receiving the row control instruction, based on the first power indication information, the SD chip is informed that it enters the low-power mode in the horizontal blank period. In this way, in the case that the SD chip detects that the pair of differential signal lines transmitting the row of pixel data is at the low level, the SD chip enters the low-power mode. Meanwhile, the data transmission is stopped over the pair of differential signal lines.

During the horizontal blank period, after the TCON and the SD chip enter the low-power mode, the TCON enters from the low-power mode to a low-power awakening mode prior to transmitting the next row of pixel data. The low-power awakening mode is a transition state for re-entering a data transmission state from the low-power mode. In the low-power awakening mode, the TCON awakens the SD chip by sending the clock calibration data, the configuration information, and the LSP to the SD chip, such that the SD chip recovers to a normal operation state to transmit the next row of pixel data.

It should be noted that the duration of the horizontal blank period is constant. As described above, a sum of the transmission duration of the idle data and durations of the TCON and the SD chip in the low-power mode and the low-power awakening mode during the horizontal blank period is the duration of the horizontal blank period. The transmission duration of the idle data is constant, and therefore, during the horizontal blank period, the shorter the duration that the TCON and the SD chip are in the low-power awakening mode, the longer the duration that the TCON and the SD chip are in the low-power mode, and then the more efficient the power saving. Because the clock calibration is required to be re-performed in the low-power awakening mode, the TCON reduces the duration of the clock calibration in the low-power awakening mode by reducing the number of the transmitted clock calibration data.

In some embodiments, a second value is stored in the TCON. The second value is the number of clock calibration data to be sent during the horizontal blank period, and the second value is determined based on the duration of the horizontal blank period. After the TCON enters the low-power mode in the horizontal blank period, the duration required to transmit the second value of the clock calibration data is determined according to the duration required to transmit each of the clock calibration data, and a time point for entering the low-power awakening mode during the horizontal blank period is determined based on the duration required to transmit the second value of the clock calibration data, and then the TCON enters the low-power awakening mode at the time point. Upon entering the low-power awakening mode, the TCON sends the second value of the clock calibration data to the SD chip, wherein the second value is less than 48.

After the SD chip re-performs the clock calibration based on the received clock calibration data, the TCON re-sends the configuration information to the SD chip. The re-sent configuration information is identical to or different from the aforementioned first configuration information, which is not limited herein.

Upon re-sending the configuration information to the SD chip, the TCON re-sends the LSP to the SD chip to perform the phase deviation calibration and scrambling reset operations. Afterwards, the TCON continues to send the display data to the SD chip, i.e., the TCON continues to send the next row of pixel data.

In some embodiments, the last row of pixel data corresponds to a frame control instruction. The frame control instruction is transmitted upon transmitting the last row of pixel data and used for static or dynamic settings of the SD chip. A K4 code is transmitted between the last row of pixel data and the frame control instruction, and the K4 code is configured to instruct a completion of transmission of the last row of pixel data in a frame of data, that is, to instruct a completion of transmission of the frame of data. Meanwhile, the K4 code identifies a start of a vertical blank period (VBP). The vertical blank period indicates an interval between an end of transmission of the frame of data and a start of transmission of the next frame of data. The idle data with the constant length is transmitted upon the frame control instruction.

In some embodiments of the present disclosure, the frame control instruction includes second power indication information. The second power indication information indicates whether the low-power mode is entered during the vertical blank period.

In some embodiments, in the case that the second power indication information in the frame control instruction is the first value, the second power indication information indicates that the TCON enters the low-power mode during the vertical blank period. In this case, upon transmitting the idle data after the frame control instruction, the TCON controls a pair of differential signal lines for transmitting the pixel data to be at a low level, and thus the TCON enters the low-power mode.

Upon detecting the second power indication information in the frame control instruction, the SD chip detects whether the pair of differential signal lines for transmitting the pixel data is at a low level. In the case that the pair of differential signal lines is detected to be at the low level, the SD chip also enters the low-power mode. Meanwhile, the data transmission is stopped over the pair of differential signal lines.

During the vertical blank period, after the TCON and the SD chip enter the low-power mode, prior to transmitting the next frame of data, likewise, the TCON enters from the low-power mode to the low-power awakening mode. In the low-power awakening mode, the TCON awakens the SD chip by re-sending the clock calibration data, the configuration information, and the LSP to the SD chip, such that the SD chip recovers to the normal operation state to transmit the next frame of data.

It should be noted that the duration of the vertical blank period is constant. A sum of the transmission duration of the idle data and durations of the TCON and the SD chip in the low-power mode and the low-power awakening mode during the vertical blank period is the duration of the vertical blank period. The transmission duration of the idle data is constant, and therefore, during the vertical blank period, the shorter the duration that the TCON and the SD chip are in the low-power awakening mode, the longer the duration that the TCON and the SD chip are in the low-power mode, and then the more efficient the power saving. Because the clock calibration is required to be re-performed in the low-power awakening mode, the TCON reduces the duration of the clock calibration in the low-power awakening mode by reducing the number of the transmitted clock calibration data.

In some embodiments, a third value is stored in the TCON. The third value is the number of the clock calibration data to be transmitted during the vertical blank period, and the third value is determined based on the duration of the vertical blank period. After the TCON enters the low-power mode in the vertical blank period, the duration required to transmit the third value of the clock calibration data is determined according to the duration required to transmit each of the clock calibration data, and a time point for entering the low-power awakening mode during the vertical blank period is determined based on the duration required to transmit the third value of the clock calibration data, and then the TCON enters the low-power awakening mode at the time point. Upon entering the low-power awakening mode, the TCON sends the third value of the clock calibration data to the SD chip, wherein the third value is less than 4000.

After the SD chip re-performs the clock calibration based on the received clock calibration data, the TCON re-sends the configuration information to the SD chip. The configuration information as re-sent is identical to or different from the configuration information previously sent, which is not limited herein.

Upon re-sending the configuration information to the SD chip, the TCON re-sends the LSP to the SD chip to perform the phase deviation calibration and scrambling reset operations. Afterwards, the TCON continues to send the display data to the SD chip, i.e., the TCON continues to send the first row of pixel data of the next frame of data.

Figure 6:
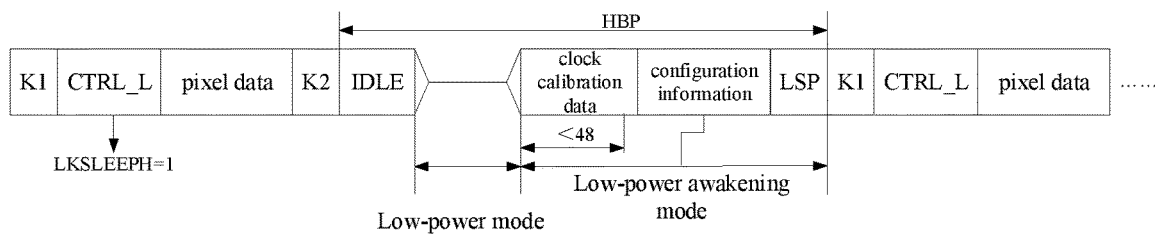
FIG. 6 is a schematic diagram of a process of transmitting a row of pixel data between a TCON and an SD chip according to some embodiments of the present disclosure.

FIG. 6 is a schematic diagram of a process of transmitting a row of pixel data between a TCON and an SD chip according to some embodiments of the present disclosure. The row of pixel data is not the last row of pixel data in the plurality of rows of pixel data corresponding to the SD chip. Referring to FIG. 6, the K1 code is transmitted first, and the K1 code is configured to indicate the start of transmission of a row of pixel data. The row control instruction (CTRL_L) is transmitted upon the K1 code, and the row control instruction carries the first power indication information (LKSLEEPH=1). The first power indication information is 1, and is configured to indicate entering the low-power mode in the horizontal blank period. The row of pixel data is transmitted upon the row control instruction. The K2 code is transmitted upon the row of pixel data, and is configured to indicate an end of the transmission of the row of pixel data and a start of the vertical blank period. The idle data is transmitted upon the K2 code, and then the TCON and the SD chip enter the low-power mode. Afterwards, in the case that the time point to enter the low-power awakening mode arrives, the TCON re-sends the clock calibration data to the SD chip, wherein the amount of the transmitted clock calibration data is less than 48. The SD chip re-performs the clock calibration based on the received clock calibration data. In the case that the SD chip completes the clock calibration, the TCON successively sends the configuration information and the LSP to the SD chip, and re-starts transmission of the next row of pixel data upon transmitting the LSP.

Figure 7:
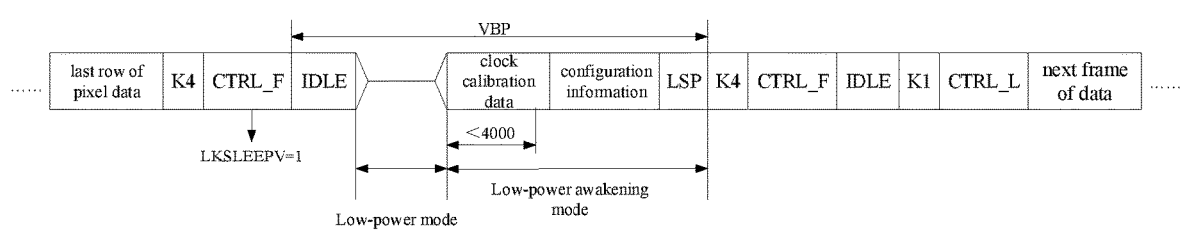
FIG. 7 is a schematic diagram of a process of transmitting the last row of pixel data between a TCON and an SD chip according to some embodiments of the present disclosure.

FIG. 7 is a schematic diagram of another process of transmitting a row of pixel data between a TCON and an SD chip according to some embodiments of the present disclosure. The row of pixel data is the last row of pixel data corresponding to the SD chip in a piece of frame data. The K1 code is transmitted first, and the K1 code is configured to indicate the start of transmission of a row of pixel data. The row control instruction (CTRL_L) is transmitted upon the K1 code. The row of pixel data is transmitted upon the row control instruction. Referring to FIG. 7, the K4 code is transmitted upon the row of pixel data, and is configured to indicate an end of transmission of the last row of pixel data corresponding to the SD chip in the frame of data. The frame control instruction (CTRL_F) is transmitted upon the K4 code, and is configured to indicate the start of the vertical blank period. The idle data is transmitted upon the frame control instruction, and then the TCON and the SD chip enter the low-power mode. Afterwards, in the case that the time point to enter the low-power awakening mode arrives, the TCON re-sends the clock calibration data to the SD chip, wherein the amount of the transmitted clock calibration data is less than 4000. The SD chip re-performs the clock calibration based on the received clock calibration data. In the case that the SD chip completes the clock calibration, the TCON successively sends the configuration information and the LSP to the SD chip, and re-starts transmission of the next frame of pixel data upon transmitting the LSP.

In some embodiments, the SD chip suffers from lock loss issues during receiving data. In this case, the SD chip re-performs the clock calibration. That is, in the case that the SD chip detects the lock loss, the state indication line is controlled to be in the first level state. In the case that the TCON detects that the status indication line is in the first level state, the TCON re-transmits the clock calibration data to the SD chip, such that the SD chip re-performs the clock calibration. After the SD chip completes the clock calibration, the TCON re-sends the configuration information to the SD chip over the data channel, and the configuration information is configured to perform a re-configuration on the physical layer parameter of the SD chip. Afterwards, the TCON sends the LSP and the display data to the SD chip. The configuration information as re-sent is identical to or different from any of the aforementioned configuration information.

In some embodiments of the present disclosure, after the SD chip completes the clock calibration, prior to sending the LSP and display data to the SD chip, the TCON first sends the configuration information to the SD chip over the data channel, so as to perform the configuration on the physical layer parameter of the SD chip, and thus the receiving performance of the SD chip is optimized, thereby improving the transmission quality of the subsequent data and the image display quality. In addition, the first identification code instructs the start of the transmission of the initialization control instruction including the configuration information, which is beneficial for the SD chip to accurately identify the initialization control instruction. Furthermore, the number of the clock edges in the signal for carrying the first identification code is less than the number of the clock edges in the signal for carrying the second identification code, such that the SD chip is ensured to better receive the data in the case that the receiving performance is not optimized. Finally, each of the bits of data in the initialization control instruction is repeatedly transmitted multiple times by the plurality of successive UIs, which reduces the probability of missing data by the SD chip, thereby improving the stability of receiving data.

A data transmission apparatus according to some embodiments of the present disclosure is described hereafter.

Figure 8:
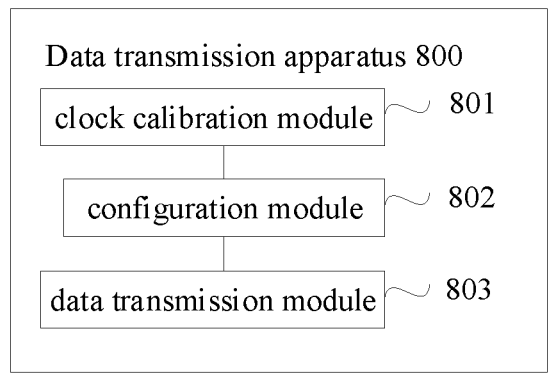
FIG. 8 is a schematic structural diagram of a data transmission apparatus according to some embodiments of the present disclosure.

Referring to FIG. 8, some embodiments of the present disclosure provide a data transmission apparatus 800, and the apparatus 800 includes:
- a clock calibration mode 801, configured to send clock calibration data to an SD chip, wherein the clock calibration data instructs the SD chip to perform a clock calibration;
- a configuration mode 802, configured to successively send a first identification code and an initialization control instruction to the SD chip over a data channel in response to completing the clock calibration by the SD chip, wherein the first identification code indicates a start of transmission of the initialization control instruction, and the initialization control instruction includes configuration information, the configuration information instructing the SD chip to perform a configuration on a physical layer parameter; and
- a data transmission module 803, configured to successively send an LSP and display data to the SD chip.

In some embodiments, the configuration information includes at least one of drive current configuration information, EQ gain configuration information, and CDR loop bandwidth configuration information of the SD chip.

In some embodiments, the configuration information includes plurality of bits of data, each of the bits of data corresponding to a transmission period, and each bit of data being repeatedly transmitted multiple times during the transmission period corresponding the bit of data.

In some embodiments, the transmission period corresponding to each bit of data includes a plurality of unit intervals that are successive, one bit of data being transmitted once within one of the unit intervals.

In some embodiments, the plurality of bits of data includes a first bit of data and a second bit of data that are adjacent, wherein a third transmission period is present between a first transmission period corresponding to the first bit of data and a second transmission period corresponding to the second bit of data, and the first transmission period is prior to the second transmission period, data transmitted in the third transmission period being data acquired by inverting the first bit of data.

In some embodiments, the number of clock edges in a signal for carrying the first identification code is less than a number of clock edges in a signal for carrying a second identification code, the second identification code being an identification code transmitted upon transmitting the initialization control instruction.

In some embodiments, the first identification code includes a first sub-code and a second sub-code that are adjacent, a clock edge being present between a signal for carrying the first sub-code and a signal for carrying the second sub-code.

In summary, in some embodiments of the present disclosure, after the SD chip completes the clock calibration, prior to sending the LSP and display data to the SD chip, the TCON first sends the configuration information to the SD chip over the data channel, so as to perform the configuration on the physical layer parameter of the SD chip, and thus the receiving performance of the SD chip is optimized, thereby improving the transmission quality of the subsequent data and the image display quality. In addition, the first identification code instructs the start of the transmission of the initialization control instruction including the configuration information, which is beneficial for the SD chip to accurately identify the initialization control instruction.

It should be noted that the division of respective functional modules is taken as an example for illustrating the data transmission apparatus provided by the foregoing embodiments. In practical applications, the functions may be distributed to different functional modules according to needs. That is, the internal structure of the device is divided into different functional modules to complete all of or a part of the functions described above. In addition, the embodiments of the data transmission apparatus belong to the same concept within the embodiments of the data transmission method provided in the foregoing embodiments. A reference is made to the method embodiments for the specific implementation process, which will not be repeated herein.

Figure 9:
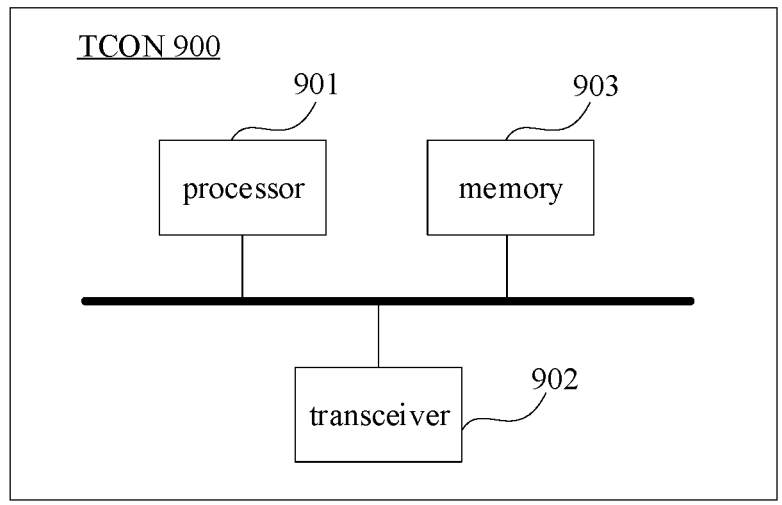
FIG. 9 is a schematic structural diagram of a TCON according to some embodiments of the present disclosure.

FIG. 9 is a schematic structural diagram of a TCON 900 according to some embodiments of the present disclosure. Referring to FIG. 9, the TCON 900 includes a processor 901, a transceiver 902, and a memory 903.

The processor 901 is implemented by using at least one hardware form of the digital signal processing (DSP), filed-programmable gate array (FPGA), programmable logic array (PLA).

The transceiver 902 is configured to receive or transmit a signal.

The memory 903 includes one or more computer-readable storage mediums. The computer-readable storage medium is non-transitory or non-volatile. In some embodiments, the non-transitory computer-readable storage medium in the memory 903 is configured to store at least one instruction, wherein the at least one instruction, when loaded and executed by the processor 901, causes the transceiver 902 is controlled to perform the data transmission method as described above.

It should be understood by those skilled in the art that, the structure shown in FIG. 9 does not constitute a limitation to the TOCN 900, and in practice, the TCON 900 includes more or fewer components than the drawings, or a combination of certain components, or different arrangements of the components.

Some embodiments of the present disclosure further provide a non-transitory computer-readable storage medium storing one or more instructions. The one or more instructions, when loaded and executed by the TCON, cause the TCON to perform the data transmission method as described above.

Some embodiments of the present disclosure further provide a computer program product storing one or more instructions. The one or more instructions, when loaded and run by a computer, cause the computer to perform the data transmission method as described above.

It should be noted that the information (including but not limited to user device information, user personal information, etc.), data (including but not limited to data for analysis, storage data, displayed data, etc.) and signals involved in the embodiments of the present disclosure are authorized by the user or sufficiently authorized by all parties, and the collection, use, and processing of the relevant data need to comply with relevant laws, regulations, and standards of the relevant countries and regions. For example, the display data and the like involved in the embodiments of the present disclosure are acquired with sufficient authorization.

Described above are merely exemplary embodiments of the present disclosure, and are not intended to limit the present disclosure. Therefore, any modifications, equivalent substitutions, improvements, and the like made within the spirit and principles of the present disclosure shall be included in the protection scope of the present disclosure.

What is claimed is:

1. A data transmission method, applicable to a timing controller, the method comprising:
sending clock calibration data to a source driver chip, wherein the clock calibration data instructs the source driver chip to perform a clock calibration;
successively sending, in response to completing the clock calibration by the source driver chip, a first identification code and an initialization control instruction to the source driver chip over a data channel, wherein the first identification code indicates a start of transmission of the initialization control instruction, and the initialization control instruction comprises configuration information, the configuration information instructing the source driver chip to perform a configuration on a physical layer parameter; and
successively sending a link stable pattern and display data to the source driver chip.

2. The method according to claim 1, wherein the configuration information comprises at least one of drive current configuration information, equalizer gain configuration information, and clock data recovery loop bandwidth configuration information of the source driver chip.

3. The method according to claim 1, wherein the configuration information comprises a plurality of bits of data, each of the bits of data corresponding to a transmission period, and each bit of data being repeatedly transmitted multiple times during the transmission period corresponding the bit of data.

4. The method according to claim 2, wherein the configuration information comprises a plurality of bits of data, each of the bits of data corresponding to a transmission period, and each bit of data being repeatedly sent multiple times during the transmission period corresponding to the bit of data.

5. The method according to claim 3, wherein the transmission period corresponding to each bit of data comprises a plurality of unit intervals that are successive, one bit of data being transmitted once within one of the unit intervals.

6. The method according to claim 3, wherein the plurality of bits of data in the initiation control instruction comprises a first bit of data and a second bit of data, wherein a third transmission period is present between a first transmission period corresponding to the first bit of data and a second transmission period corresponding to the second hit of data, and the first transmission period is prior to the second transmission period, data transmitted in the third transmission period being data acquired by inverting the first bit of data.

7. The method according to claim 1, wherein a number of clock edges in a signal for carrying the first identification code is less than a number of clock edges in a signal for carrying a second identification code, the second identification code being an identification code transmitted upon transmitting the initialization control instruction.

8. The method according to claim 1, wherein the first identification code comprises a first sub-code and a second sub-code that are adjacent, a clock edge being present between a signal for carrying the first sub-code and a signal for carrying the second sub-code.

9. The method according to claim 6, wherein the first identification code comprises a first sub-code and a second sub-code that are adjacent, a clock edge being present between a signal for carrying the first sub-code and a signal for carrying the second sub-code.

10. A timing controller, comprising a processor, a transceiver, and a memory;
wherein the memory stores one or more instructions executable by the processor; and
the processor, when loading and running the one or more instructions, is caused to control the transceiver to perform:
sending clock calibration data to a source driver chip, wherein the clock calibration data instructs the source driver chip to perform a clock calibration;
successively sending, in response to completing the clock calibration by the source driver chip, a first identification code and an initialization control instruction to the source driver chip over a data channel, wherein the first identification code indicates a start of transmission of the initialization control instruction, and the initialization control instruction comprises configuration information, the configuration information instructing the source driver chip to perform a configuration on a physical layer parameter; and
successively sending a link stable pattern and display data to the source driver chip.

11. The timing controller according to claim 10, wherein the configuration information comprises at least one of drive current configuration information, equalizer gain configuration information, and clock data recovery loop bandwidth configuration information of the source driver chip.

12. The timing controller according to claim 10, wherein the configuration information comprises a plurality of hits of data, each of the bits of data corresponding to a transmission period, and each bit of data being repeatedly transmitted multiple times during the transmission period corresponding the bit of data.

13. The timing controller according to claim 12, wherein the transmission period corresponding to each of the bits of data comprises a plurality of unit intervals that are successive, one bit of data being transmitted once within one of the unit intervals.

14. The timing controller according to claim 12, wherein the plurality of bits of data in the initiation control instruction comprises a first bit of data and a second hit of data, wherein a third transmission period is present between a first transmission period corresponding to the first bit of data and a second transmission period corresponding to the second bit of data, and the first transmission period is disposed prior to the second transmission period, data transmitted in the third transmission period being data acquired by inverting the first hit of data.

15. The timing controller according to claim 10, wherein a number of clock edges in a signal for carrying the first identification code is less than a number of clock edges in a signal for carrying a second identification code, the second identification code being an identification code transmitted upon transmitting the initialization control instruction.

16. The timing controller according to claim 10, wherein the first identification code comprises a first sub-code and a second sub-code that are adjacent, a clock edge being present between a signal for carrying the first sub-code and a signal for carrying the second sub-code.

17. A non-transitory computer-readable storage medium, storing one or more computer programs, wherein the one or more computer programs, when loaded and executed by a computer, cause the computer to perform:
sending clock calibration data to a source driver chip, wherein the clock calibration data instructs the source driver chip to perform a clock calibration;
successively sending, in response to completing the clock calibration by the source driver chip, a first identification code and an initialization control instruction to the source driver chip over a data channel, wherein the first identification code indicates a start of transmission of the initialization control instruction, and the initialization control instruction comprises configuration information, the configuration information instructing the source driver chip to perform a configuration on a physical layer parameter; and successively sending a link stable pattern and display data to the source driver chip.

18. The non-transitory computer-readable storage medium according to claim 17, wherein the configuration information comprises at least one of drive current configuration information, equalizer gain configuration information, and clock data recovery loop bandwidth configuration information of the source driver chip.

19. The non-transitory computer-readable storage medium according to claim 17, wherein the configuration information comprises a plurality of bits of data, each of the bits of data corresponding to a transmission period, and each bit of data being repeatedly transmitted multiple times during the transmission period corresponding the bit of data.

20. The non-transitory computer-readable storage medium according to claim 19, wherein the transmission period corresponding to each of the bits of data comprises a plurality of unit intervals that are successive, one bit of data being transmitted once within one of the unit intervals.

* * * * *

UNITED STATES PATENT AND TRADEMARK OFFICE
CERTIFICATE OF CORRECTION

| | | |
|---|---|---|
| PATENT NO. | : 11,961,451 B2 | Page 1 of 1 |
| APPLICATION NO. | : 18/147997 | |
| DATED | : April 16, 2024 | |
| INVENTOR(S) | : Jangjin Nam et al. | |

It is certified that error appears in the above-identified patent and that said Letters Patent is hereby corrected as shown below:

On the Title Page

Replace "(73) Assignees: Beijing ESWIN Computing Technology Co., Ltd., Beijing (CN); Hefel ESWIN Computing Technology Co. Ltd., Hefei (CN)" with the following:
--(73) Assignees: Beijing ESWIN Computing Technology Co., Ltd., Beijing (CN);
Hefei ESWIN Computing Technology Co. Ltd., Hefei (CN)--

In the Claims

Column 18 Line 28 of Claim 12 should read:
--the configuration information comprises a plurality of bits of--

Column 18 Line 40 of Claim 14 should read:
--tion comprises a first bit of data and a second bit of data,--

Column 18 Line 47 of Claim 14 should read:
--bit of data.--

Signed and Sealed this
Twenty-fifth Day of June, 2024

Katherine Kelly Vidal
*Director of the United States Patent and Trademark Office*